Patented Oct. 17, 1922.

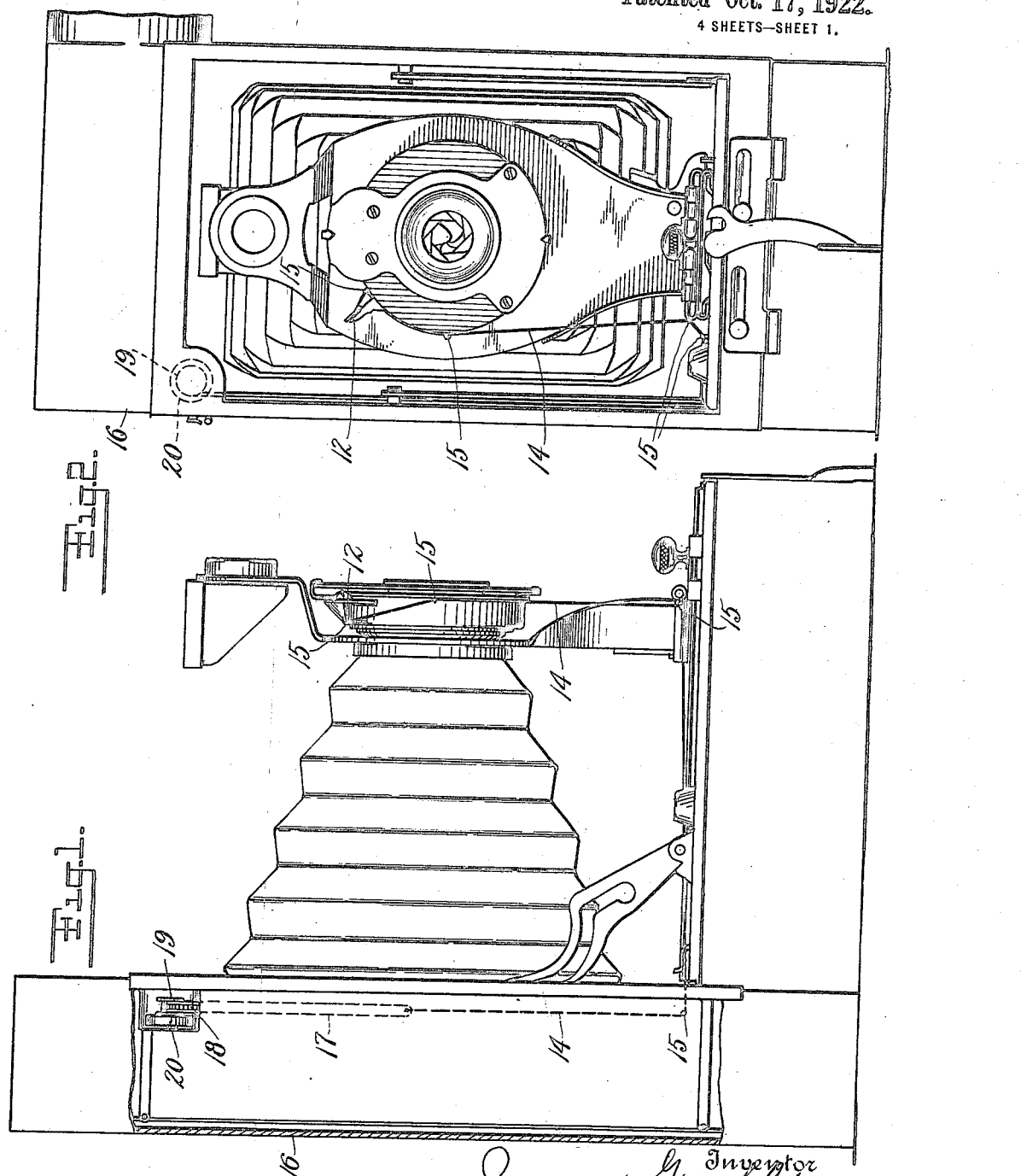

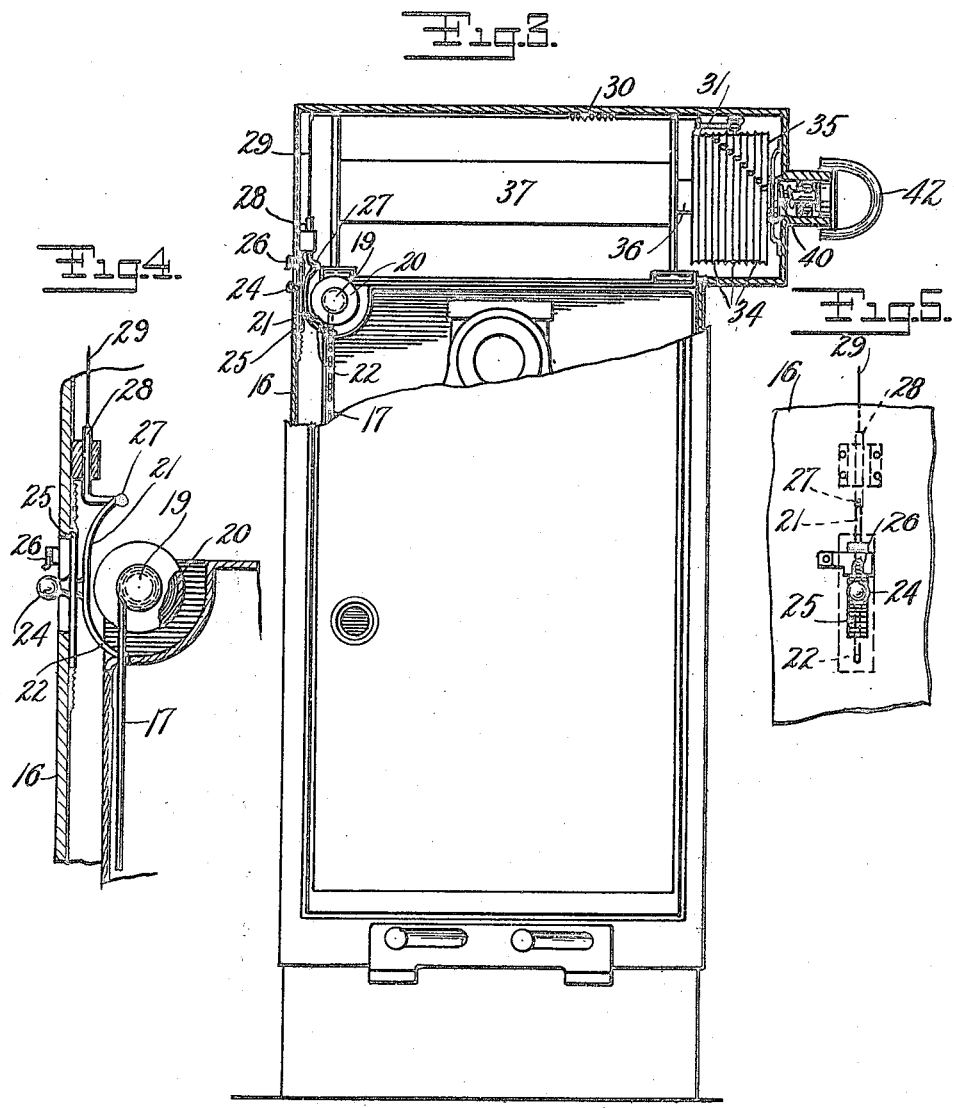

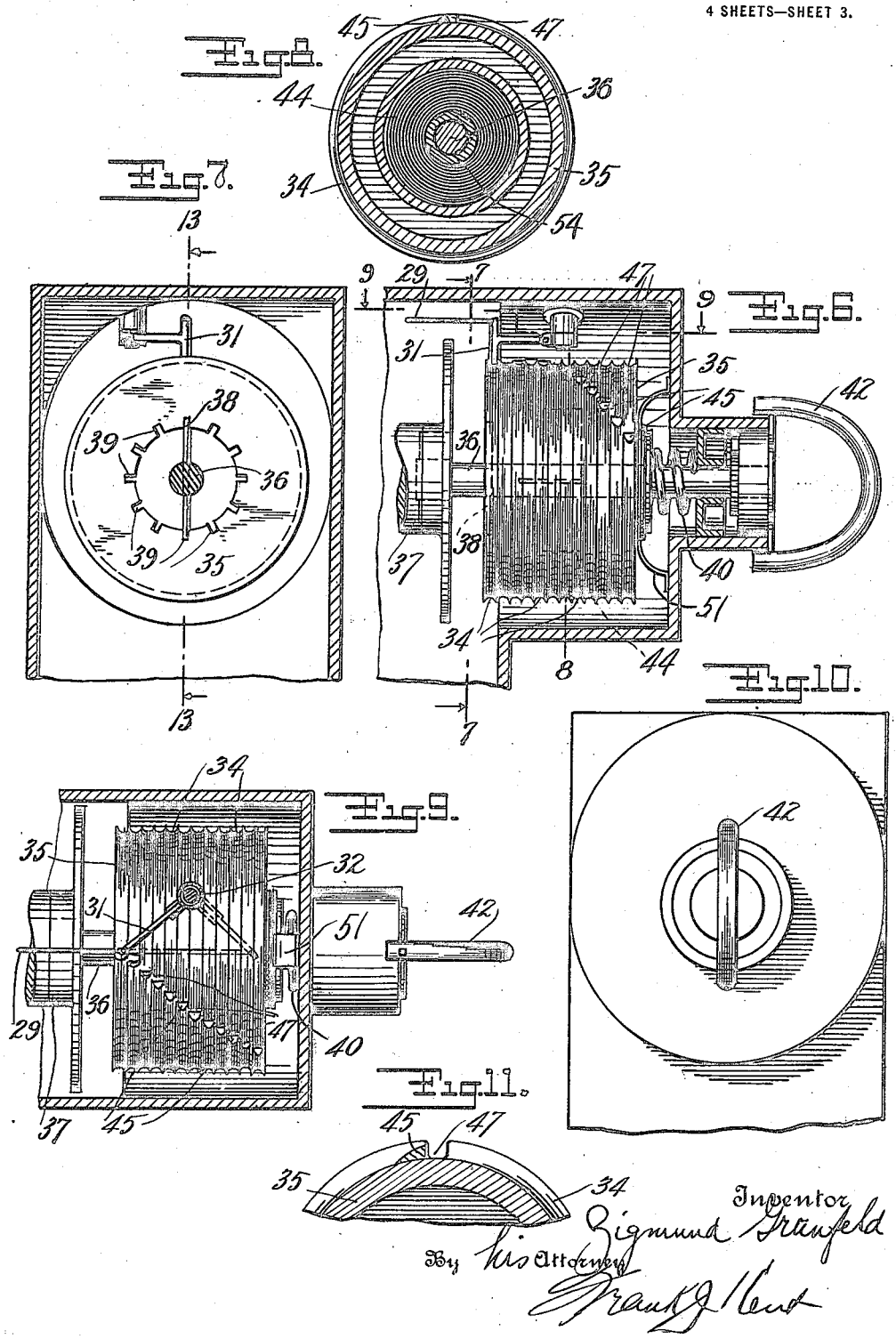

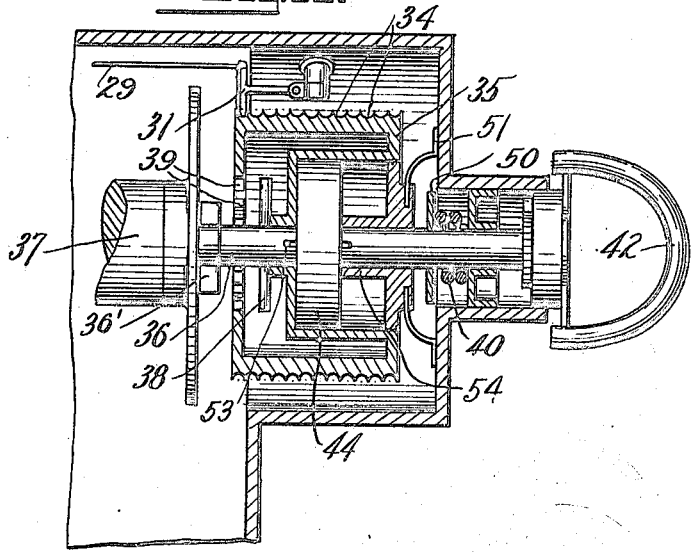
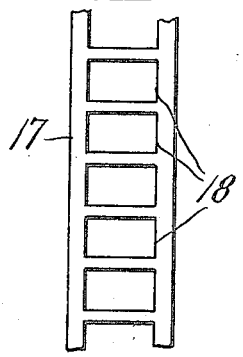
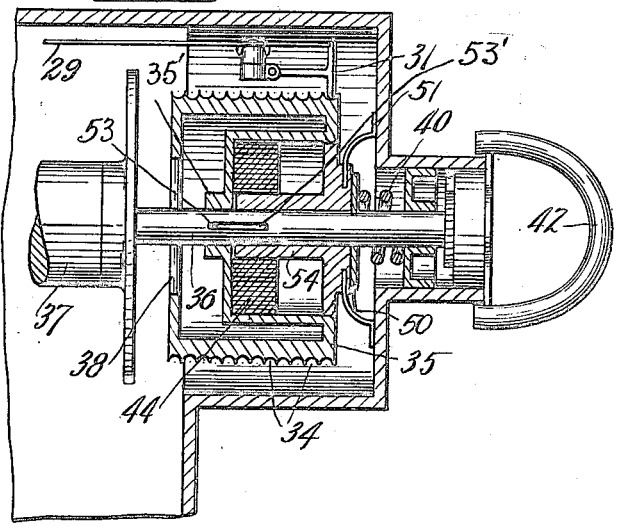

1,432,180

UNITED STATES PATENT OFFICE.

ZIGMUND GRÜNFELD, OF NEW YORK, N. Y.

PHOTOGRAPHIC CAMERA.

Application filed August 6, 1918. Serial No. 248,622.

*To all whom it may concern:*

Be it known that I, ZIGMUND GRÜNFELD, a subject of the Emperor of Austria, residing at the borough of Manhattan, in the county of New York, city and State of New York, have invented certain new and useful Improvements in Photographic Cameras, of which the following is a specification.

This invention relates to improvements in cameras of the type in which sensitive film is wound up on a spool and intermittently unwound to present unexposed surfaces.

One of the objects of the invention is to provide an arrangement of parts whereby the film will be automatically unwound as successive actuations of the shutter take place.

Another object is to provide for disconnecting the automatically operative device so that manual control may be used if desired.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which I have shown merely a preferred form of embodiment of the invention, Figure 1 is a side view of a camera, with the bellows extended and the side of the box broken away; Figure 2 is a front view of the same; Figure 3 is a view similar to Figure 2 showing the camera closed, but with part of the front closure broken away; Figure 4 is an enlarged detail of a part of the film-actuating mechanism; Figure 5 is a detail in elevation of certain of the parts shown in section in Figure 4; Figure 6 is a detail sectional view of part of the film-control device; Figure 7 is a view taken on the line 7—7 of Figure 6; Figure 8 is a sectional view taken on the line 8—8 of Figure 6; Figure 9 is a sectional view taken on the line 9—9 of Figure 6; Figure 10 is an enlarged end view of the finger-piece for manual operation of the film and for rewinding of the film spool actuating spring; Figure 11 is a detail of the control drum; Figure 12 is a detail view of the strap; Figure 13 is a view similar to Figure 6, but showing the control drum also in section, and with the shaft 36 pulled out so that clutches 36' and 38 are disengaged from the film spool and the drum respectively; and Figure 14 is a view similar to Figure 13, but with the parts in the Figure 6 position.

Referring to the numerals on the drawings, there is shown in Figures 1, 2 and 3 a camera of standard type. The shutter is controlled by the usual finger-piece indicated at 12 in Figures 1 and 2, and a cord 14 is connected to this finger-piece 12, as shown in Figure 1, so that as the finger-piece 12 is moved in the direction of the arrow of Figure 2 or towards the left, the result is to move the cord 14 upwardly, or in the direction of the arrow, Figure 2. Cord 14 from its point of attachment runs through suitable eyelets or the like 15 to a point within the camera box 16 whence it travels upwardly (Figure 1) and is connected to the end of a flexible strap 17. This strap is provided with cut-out portions 18 as shown in Figure 12, and is wound on a spool 19 which spool is controlled by a coiled spring 20 that tends to keep the strap 17 always wound up on the spool. The reason for this arrangement is that when the camera is closed the slack in the cord 14 and strap 17 is automatically taken up by the spring 20 and when the camera is opened up the necessary extension of the cord and strap are permitted. Suitably supported on the inside of the box adjacent the spool 19 is a connecting member 21, having one end formed with a hook 22 which is adapted to engage in the cut-outs 18 of the strap 17 as shown in Figure 4. This connecting member 21 is provided with a knob 24 at the outside of the camera box and there is also preferably a light shield 25 interposed between the connecting member 21 and the knob 24, this shield sliding on the inner surface of the camera box around the opening through which the knob 24 extends. When the parts are in the position shown in Figure 4 the hook end 22 of the connecting member will engage with a cut-out portion 18 of the strap 17, but if such connection is not desired, as for instance, before opening up the camera, the knob 24 may be pulled to the left (Figure 4) and engaged in the clip 26, the result of this being to keep the hook end 22 of the connecting member 21 out of the path of travel of the strap 17. The upper end of the connecting member 21 is pivoted as indicated at 27, to permit of this movement of the hook end 22 away from the strap 17, and it will be understood of course that the light shield 25 is flexible also. The pivotal connection 27 is to a slide 28 and to this slide is connected a cord 29 having somewhere in its length a shock-absorbing spring 30, this cord 29 being connected at its other end to a pivoted finger 31 which is controlled by a coiled spring 32 whereby it is normally urged to movement towards the right (Figures 3, 6 and 9). The end of this finger 31 engages in grooves 34 of a drum 35 which is rotatably mounted on a hub 54 carried by bracket 51. Drum 35 also has a bearing 35' on the shaft 36, shaft 36 passing through hub 54 and drum 35. Drum 35 rotates with shaft 36, but the shaft is movable longitudinally of the drum, by means of a pin 53 in the bearing member which passes through a slot 53' of the shaft. Spring 40 is secured at one end to the stationary hub 54 and at the other end to drum 35. Shaft 36 may also carry a pin 38 to engage with appropriate notches 39 of drum 35 (Figure 7). The shaft 36 is normally maintained in the Figure 14 position by means of a spring 40 that presses against a collar 50 on the shaft to urge it towards the left. However by pulling the shaft towards the right, the connection between the clutch end 36' of the shaft and the film take-up spool 37 is broken, so that the shaft and drum may be rotated to put the coil spring 44 under tension, handle 42 being utilized for this purpose.

In operation, if the parts are in the Figure 6 position, the shaft and drum are rotated to bring the end of the lever 31 from the Figure 13 position to the starting position shown in Figure 14, spool 37 having of course been disconnected from clutch 36'. The outer surface of the drum is provided with as many annular grooves 34 as the number of film exposures for which the camera is adapted. I have illustrated twelve such grooves, which means that the apparatus is designed to operate with a film spool of twelve exposures. Starting with the Figure 14 position of the parts, and assuming that the shutter control piece 12 is operated, this results in an upward pull in the cord 14 and a downward pull on the strap 17. Because of the engagement of the hook end 22 of the connecting member 21 with the strap 17, this results in a downward travel of the slide 28 and a consequent pull on the cord 29, which again causes the lever end 31 to move towards the left away from a stop 45 in the first groove 34, and through a cut-out portion 47 of the side wall of this groove into the next groove 34. The drum 35 now rotates under the influence of spring 44 until the lever end 31 meets the stop 45 of the second groove. And this operation is repeated for each actuation of the shutter control member 12 until all of the exposures have been made. The parts are now in the Figure 6 position. The spool 37 is disconnected from clutch 36' by pulling shaft 36 to the right, and the drum and shaft turned in the reverse direction; the lever end 31 slips from groove to groove through the cut-out spaces provided between adjacent stop members 45, until it reaches the Figure 14 position, the stop members being preferably beveled as indicated in Figure 11 to facilitate this rightwards traverse of the lever end 31, under the influence of its spring 32. This reverse rotation of the shaft and drum not only brings the finger 31 back to starting position, but restores the tension of drum spring 44.

When the camera is to be opened the knob 24 must be engaged by the clip 26, so that there is no actuation of cord 29, but before an exposure is made, of course, the knob 24 must be released, to permit hook 22 to engage with strap 17, so that upon actuation of the shutter the intermittent movement of the drum and consequently of the film may take place.

In order to make the device as inexpensive as possible I propose to construct the drum 35 of sheet metal, with the grooves pressed therein and the stop members formed in the pressing.

I claim:

1. In a film feeding mechanism for a camera comprising a film spool and a spring actuated drum associated therewith, a series of parallel grooves on the periphery of said drum, a stop arranged in each of said grooves, a pawl adapted for engagement with the stops and means for transversely moving the pawl from engagement with one stop into the next adjacent parallel groove and in the path of the stop therein to allow for an intermittent release of the spring actuated drum.

2. In a film feeding mechanism for a camera comprising a film spool and a spring actuated drum associated therewith, a series of annular grooves on the periphery of said drum, a stop arranged in each of said grooves, a pawl adapted for engagement with the stops, and means for transversely moving the pawl from groove to groove to allow for an intermittent release of the spring actuated drum.

3. In a film feeding mechanism for a camera comprising a film spool and a spring actuated drum associated therewith, a series of annular grooves on the periphery of said drum, a communicating passage between adjacent grooves on the drum, a stop arranged in each groove adjacent the communicating passage, a pawl adapted for engagement with the stops, and means for moving the pawl through the communicating passage from groove to groove to allow for an intermittent release of the spring actuated drum.

4. In a film feeding mechanism for a camera comprising a film spool and a spring actuated drum associated therewith, a series of annular grooves arranged on the periphery of said drum, a communicating passage between adjacent annular grooves, a stop positioned in each of said grooves, a pawl adapted for coaction with said stops, means for moving the pawl from groove to groove to allow for an intermittent release of the spring actuated drum, and means for returning the pawl through the grooves to its initial position on the reverse movement of said drum.

5. In a film feeding mechanism for a camera comprising a film spool and a spring actuated drum associated therewith, a series of annular grooves on the periphery of said drum, progressively arranged stops one in each of said grooves, a pawl adapted for engagement with said stops, and means for transversely moving the pawl from groove to groove to allow for an intermittent release of the spring actuated drum.

6. In a film feeding mechanism for a camera comprising a film spool and a spring actuated drum associated therewith, a series of progressively arranged abutments on the peripheral surface of said drum, a pawl adapted for engagement with the abutments, and means for transversely moving the pawl from the path of one abutment and into the path of movement of the adjacent abutment thereby allowing during said movement a single revolution of the spring actuated drum.

In testimony whereof I affix my signature.

ZIGMUND GRÜNFELD.